United States Patent
VanOtteren

(12) 
(10) Patent No.: US 6,323,453 B1
(45) Date of Patent: Nov. 27, 2001

(54) LOW INERTIA BEARING FOR RESISTANCE SEAM WELDING WHEEL

(75) Inventor: Robert G. VanOtteren, Bay City, MI (US)

(73) Assignee: Newcor, Inc., Bloomfield Hills, MI (US)

(*) Notice: Subject to any disclaimer, the term of this patent is extended or adjusted under 35 U.S.C. 154(b) by 0 days.

(21) Appl. No.: 09/509,615

(22) PCT Filed: Sep. 29, 1997

(86) PCT No.: PCT/US97/18099

§ 371 Date: Mar. 28, 2000

§ 102(e) Date: Mar. 28, 2000

(87) PCT Pub. No.: WO99/16573

PCT Pub. Date: Apr. 8, 1999

Related U.S. Application Data

(63) Continuation-in-part of application No. 08/648,259, filed on May 14, 1996, now abandoned.

(51) Int. Cl.$^7$ ................................................. B23K 11/06
(52) U.S. Cl. .................................................. 219/81; 219/84
(58) Field of Search ................................. 219/81, 84, 82, 219/83; 228/49.1

(56) References Cited

U.S. PATENT DOCUMENTS

| | | |
|---|---|---|
| 1,052,490 | 2/1913 | Linden et al. . |
| 1,276,030 | 8/1918 | Cary . |
| 1,326,912 | 1/1920 | Cary . |
| 1,554,273 | 9/1925 | Gibb . |
| 1,565,012 | 12/1925 | Jones . |
| 1,787,115 | 12/1930 | Lewis . |
| 2,928,930 | 3/1960 | Veale . |
| 2,957,975 | 10/1960 | Pearson . |

(List continued on next page.)

FOREIGN PATENT DOCUMENTS

| | | |
|---|---|---|
| 684 007 | 10/1939 | (DE) . |
| 1 790 283 | 5/1973 | (DE) . |
| 231 636 | 4/1925 | (GB) . |
| 2-207975 | 8/1990 | (JP) . |
| 155 896 | 1/1962 | (SU) . |

*Primary Examiner*—Tom Dunn
*Assistant Examiner*—Jonathan Johnson
(74) *Attorney, Agent, or Firm*—Flynn, Thiel, Boutell & Tanis, P.C.

(57) ABSTRACT

A seam welding apparatus having an improved bearing support arrangement for the transversely movable upper weld wheel. This upper weld wheel is nonrotatably secured adjacent one end of an elongate electrically conductive shaft, which shaft adjacent its other end is supported within a conventional electrically conductive bearing assembly which rotatably supports the shaft and transmits electrical energy thereto from an external source such as a transformer. The nonrotatable housing associated with the bearing assembly is pivotally supported relative to the machine frame by a pivot which extends adjacent the housing in perpendicular relation to the shaft axis, with this pivot axis being disposed remote from the weld wheel. A welding force generating assembly such as a pressure cylinder and ram are mounted on the machine frame, with the ram being movably supported and acting downwardly onto a spring unit which has an electrical insulator associated therewith. This spring unit and its electrical insulator in turn are rotatably supportingly engaged with the shaft closely axially adjacent the weld wheel. The bearing housing as well as the weld wheel shaft are mounted on a slide member which is supported for movement generally perpendicularly with respect to a plane which is defined by the nip between the weld wheels. The ram of the force generating assembly is preferably coupled directly to the slide member. The spring unit in turn is coupled between the slide unit and the shaft, preferably at the end of the shaft adjacent the weld wheel.

16 Claims, 4 Drawing Sheets

U.S. PATENT DOCUMENTS

| | | |
|---|---|---|
| 3,102,945 | 9/1963 | Opprecht . |
| 3,250,890 | 5/1966 | Denis et al. . |
| 3,325,623 * | 6/1967 | Briggs . |
| 3,517,158 * | 6/1970 | Briggs . |
| 4,100,391 | 7/1978 | Wilbur . |
| 4,376,884 | 3/1983 | Gold et al. . |
| 4,476,371 | 10/1984 | Schreiber . |
| 4,803,325 | 2/1989 | Frei et al. . |
| 4,939,335 | 7/1990 | Mueller . |
| 4,973,089 * | 11/1990 | Wheeler et al. . |
| 5,021,626 | 6/1991 | Boyd et al. . |
| 5,122,629 | 6/1992 | Stieger . |
| 5,131,581 | 7/1992 | Geiermann . |
| 5,420,389 | 5/1995 | Davies . |
| 6,037,558 * | 3/2000 | Geiermann et al. . |
| 6,105,845 * | 8/2000 | Aebersold et al. . |

* cited by examiner

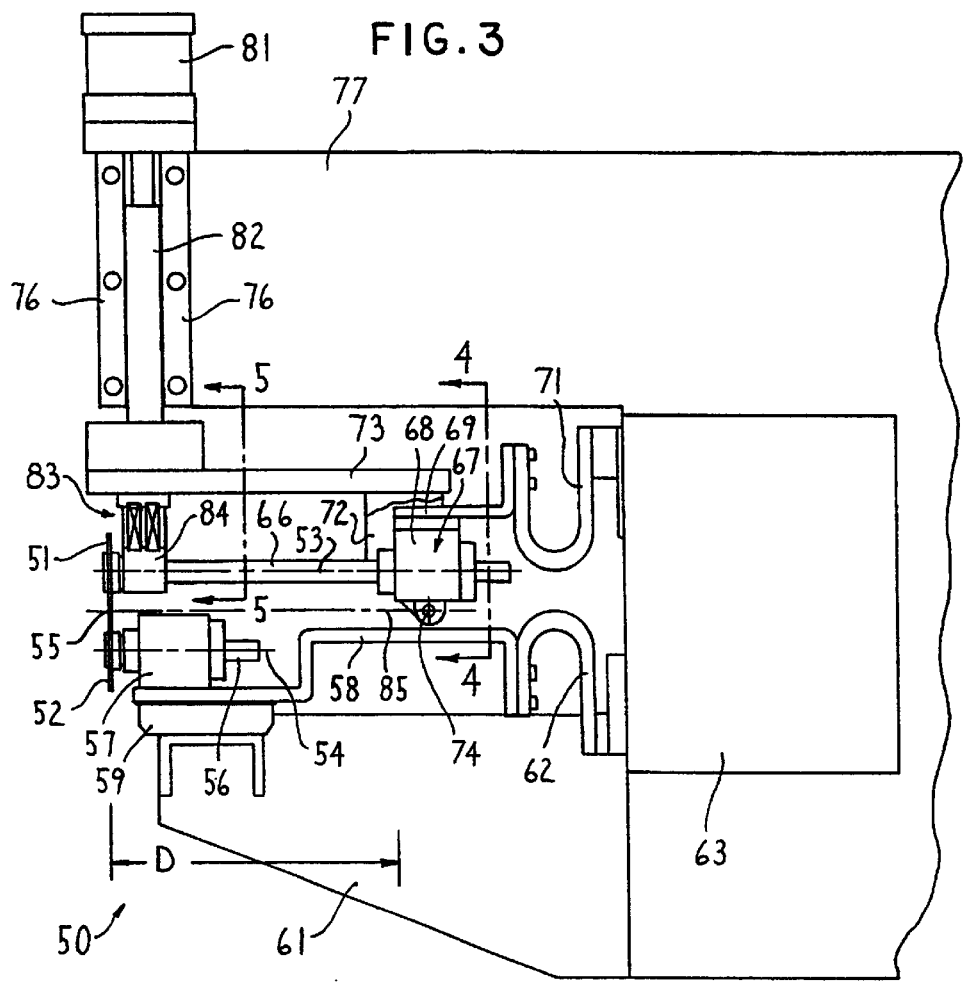
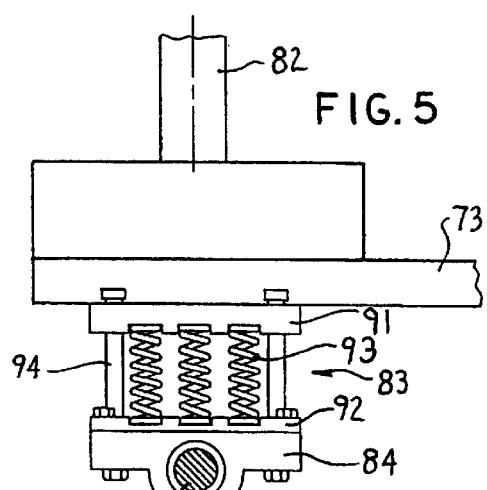
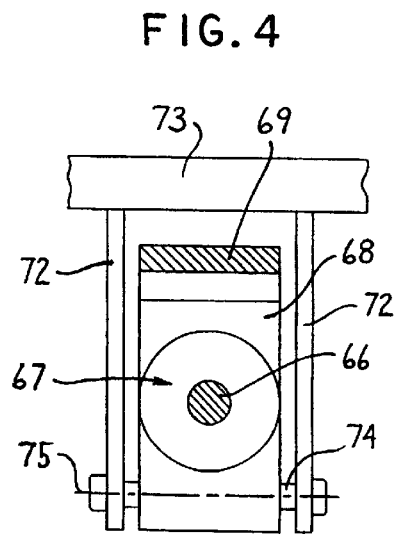

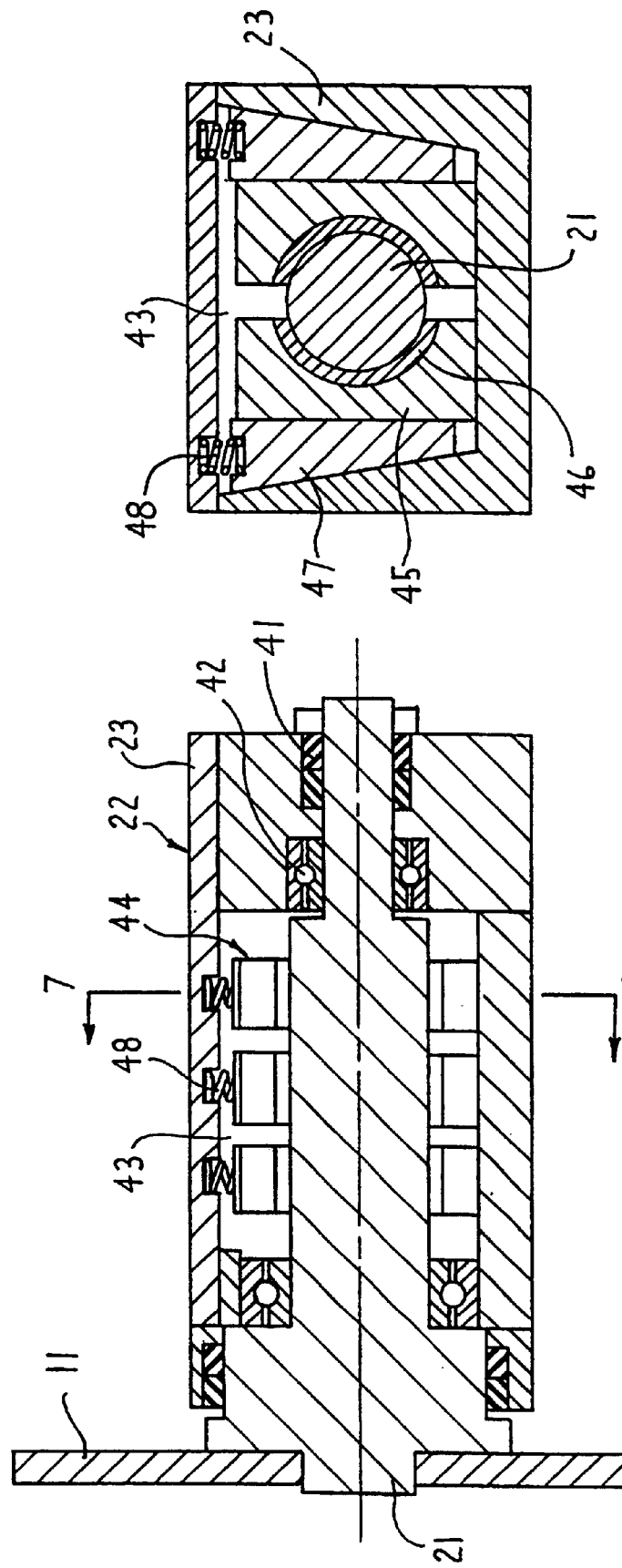

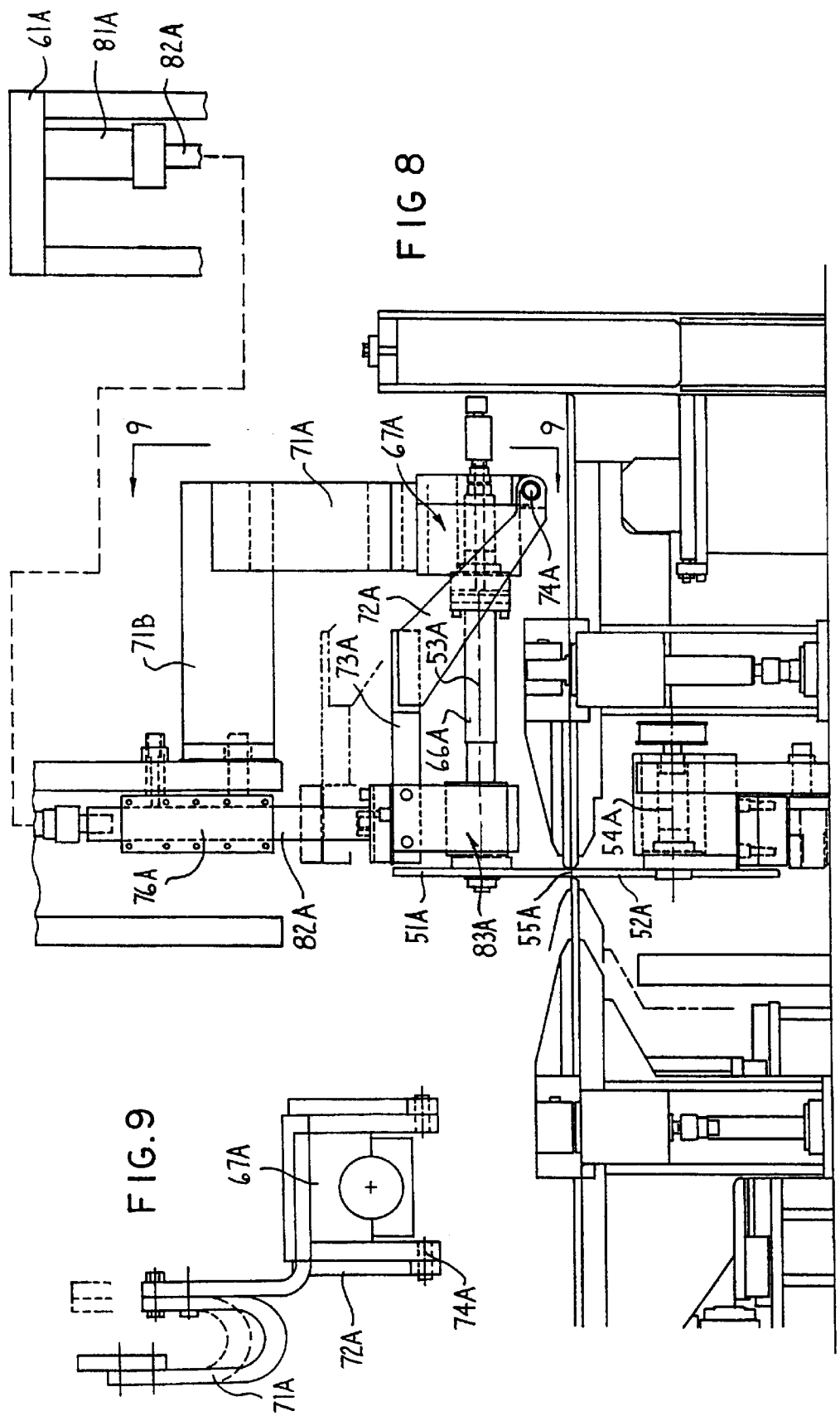

LOW INERTIA BEARING FOR RESISTANCE SEAM WELDING WHEEL

CROSS REFERENCE TO RELATED APPLICATION

This application is a 35 USC 371 nationalization of PCT Application No. PCT/US97/18099, filed Sep. 29, 1997, which is a continuation-in-part of U.S. application Ser. No. 08/648,259 filed May 14, 1996 and entitled "LOW INERTIA BEARING ARRANGEMENT FOR WELD WHEEL OF SEAM WELDER" now abandoned. The disclosure of Ser. No. 08/648,259 is, in its entirety, incorporated herein by reference.

FIELD OF THE INVENTION

This invention relates to a resistance seam welder of the type employing opposed weld wheels functioning as electrodes for permitting creation of a seam weld between overlapping parts of a workpiece which is fed into the nip between and engaged by the weld wheels and, more particularly, to an improved bearing support arrangement for one of the weld wheels to permit minimization of inertia and hence increased movement flexibility of the weld wheel so as to more rapidly respond to variations in thickness of the material being welded as it is fed through the nip, and to simultaneously permit compensation for the significant reduction in diameter of the weld wheel caused by wear as a result of ongoing operation of the seam welder.

BACKGROUND OF THE INVENTION

In a conventional seam welder of the resistance type, the welder is conventionally provided with upper and lower weld rolls which function as electrodes and which are relatively urged toward one another so as to permit material to be welded, such as overlapping sheets, to be relatively fed into and through the nip between the opposed weld wheels. The weld wheels directly engage the overlapping sheets and effect compression and electric heating so as to effect both welding and mashing of the overlapping sheets to create what is known as a seam weld.

Referencing FIG. 1, there is illustrated a conventional seam welder 10 wherein there is respectively provided upper and lower weld wheels 11 and 12 respectively supported for rotation about axes 13 and 14, these latter axes extending approximately parallel. The upper and lower weld wheels have their opposed peripheries substantially contacting at the nip 15, and material to be welded is fed into and through this nip. The material to be welded typically employs a pair of sheet metal parts or portions such as illustrated at 16 and 17 in FIG. 2, which portions have an overlapping area or region 18 which is relatively longitudinally fed into the nip so as to permit creation of a seam weld between the overlapping portions. The actual creation of the seam weld and the technology associated with doing so is well known, so that further detailed description of the actual welding steps will not be described in detail.

In the conventional seam welder 10, the upper weld wheel 11 is nonrotatably secured to a rotatable shaft 21 which in turn is rotatably supported within an electrically conductive bearing assembly 22, the latter having a nonrotatable outer housing 23 which has an electrically conductive mounting plate 24 fixed thereto. This conductive mounting plate 24 in turn mounts thereon an electrical insulator 25 which in turn cooperates with a lower end of a vertically reciprocal ram 26, the latter being slidably guided within the stationary machine frame 27. The upper end of ram 26 is acted on by a conventional air pressure cylinder 28 which is appropriately energized by pressurized air so as to impose a downward force on the ram which in turn is transmitted downwardly so as to be imposed on the upper weld wheel 11 and thus on the work located in the nip 15.

The lower weld wheel 12 is also nonrotatably supported on a shaft 31 which is also rotatably supported within an electrically conductive bearing assembly 32, the nonrotatable housing 33 of which also fixedly joins to an electrically conductive plate 34, the latter being stationarily supported on a stationary part 36 of the machine frame through an intermediate electrical insulator 35.

The electrically conductive members or plates 24 and 34 are in turn joined to and supplied with electrical energy from a conventional welding transformer 37 by being respectively connected thereto through flexible conductive straps 38 and 39.

A conventional and known construction of the electrically conductive bearing assembly 22 or 32 is illustrated in FIGS. 6–7. This bearing assembly 22 includes the outer housing 23 which is disposed generally in surrounding relationship to the shaft 21, and this bearing assembly provides seal structure, bearing structure and electrically conductive structure cooperating between the housing 23 and the shaft 21. For example, opposite ends of the elongate housing 23 are normally provided with annular seals 41 to create a sealed relationship between the shaft and the housing bearings 42 such as roller or ball bearings are also typically provided for cooperation between the housing 23 and the shaft 21, which bearings 42 are disposed adjacent opposite axial ends of the housing 23 and are typically positioned axially inwardly from the respectively adjacent seals 41. The housing 23 in addition defines therein an annular chamber 43 of substantial size, which chamber extends axially between the bearings 42 in surrounding relationship to the shaft 21. This chamber 43 contains therein at least one and typically several electrically conductive contact assemblies 44 positioned in axially adjacent relationship for transmitting electrical current from the housing 23 to the rotating shaft 21. In the illustrated arrangement, this contact assembly 44 includes a pair of contact shoes 45 which are disposed in straddling relationship on generally opposite sides of the shaft 21, with these opposed contact shoes 45 typically being constructed of copper and having opposed recesses which are provided with a silver layer 46 thereon, these silver layers 46 in turn being disposed in slidable current-conducting contact with the exterior of the rotatable shaft 21. The contact members 45 themselves are normally urged inwardly into proper contacting engagement with the shaft 21 by appropriate wedges 47 which coat between the contact members and the housing 23, with these wedges 47 typically being acted on by springs 48. The chamber 43 is typically provided with oil, such as castor oil, circulated therethrough for cooling and lubricating purposes.

In the conventional seam welding apparatus as illustrated by FIG. 1, the electrically conductive bearing assemblies such as illustrated at 22 and 32 are typically mounted directly at or axially adjacent the weld wheel or electrode, with the latter being positioned substantially directly adjacent at least one axial end of the bearing assembly, with the upper bearing assembly 22 then being acted on directly by the pressure ram 26 so that the pressing force which acts downwardly through the ram onto the upper weld wheel and thence through the workpiece onto the lower weld wheel is accordingly positioned in close proximity to the work plane, namely the vertical plane containing the weld wheels, so as to maximize the effectiveness of the welding force.

While the overall arrangement briefly described above is desirable with respect to the effective use of the pressing or welding force as imposed between the weld wheels, nevertheless the overall evolution of conductive bearing assemblies as utilized in seam welders of this type has now limited the overall effectiveness and efficiency of seam welders, particularly with respect to their ability to more effectively utilize the welding force and even more specifically with respect to their ability to operate at higher linear speeds (that is, the relative speed at which the work moves through the weld nip). These conductive bearing assemblies as described above and as illustrated by FIGS. 6–7, have evolved so as to typically incorporate silver contact shoes immersed in oil which is part of a recirculating system so that the oil recirculates through the bearing assembly to effect proper lubrication and cooling thereof. This evolution has resulted in conductive bearing assemblies which are more efficient with respect to the bearing function and the electrically conductive function, in that such bearings have been capable of running reliably for one to two years with little or no maintenance. The significant disadvantage of this evolution in conductive bearings, however, is that these conductive bearing assemblies are bulky and heavy, and in fact such conductive bearing assemblies will typically weight between 150 and 500 pounds, depending upon the force and current carrying capability of the bearing assembly. Thus, when such large and heavy conductive bearing assembly is directly coupled to the pressure ram and is located directly at or adjacent the weld roller, such as the vertically movable upper weld roller 11, the total weight of the overall movable assembly including the ram, the bearing assembly and the weld wheel is quite high and in fact typically reaches the point that the welding force which is transmitted through the assembly to the upper weld wheel is unable to adequately respond to the collapse and material thickness variations which exist in the weld nip. The upper weld wheel is thus unable to vertically move and hence respond with the desired speed or frequency so as to maintain adequate weld contact and pressure while enabling the workpiece to be fed through the nip at the desired rate. This nonresponsiveness of the upper weld wheel and the overall heavy assembly defined thereby, in conjunction with the conductive bearing assembly and the moving pressing ram, thus have been observed to limit the speed with which material can be fed into the nip to effect adequate seam welding thereof. In fact, it has been observed that the practical speed for feeding material into and through the nip of the weld wheels in many applications is limited to about 20 feet per minute due to the mass of the bearing assembly 22 and the slow responsiveness of the driving air cylinder 28.

The aforementioned arrangement is further complicated by the fact that the weld wheels 11 and 12 themselves undergo significant wear during continued operation of the seam welder. In fact, it is not uncommon for the diameter of the weld wheel to decrease up to two inches prior to its being replaced, for example a 14 inch diameter weld wheel may wear down to about 12 inches in diameter prior to its being replaced. This significant wear must also be compensated for by the driving cylinder, which is in addition to the rather rapid but small adjustment desired so as to compensate for thickness variations in the workpiece, thus making creation of a quality seam weld while operating at a high linear speed very difficult and in most instances impossible to achieve with the current and preferred construction of the bearing support.

Accordingly, it is an object of this invention to provide an improved bearing support arrangement for the moving weld wheel of a seam welding apparatus, which improved bearing support arrangement is believed to overcome the aforementioned disadvantage and provide for greater and more rapid response of the moving weld wheel to thickness variations in the material being seam welded, while also compensating for weld wheel wear.

More specifically, this invention relates to an improved bearing support arrangement for the transversely movable weld wheel (i.e., the upper weld wheel in the illustrated embodiment) of a seam welding apparatus, which bearing support arrangement is effective in isolating or at least minimizing the effect of the mass of the pressing ram and of the conductive bearing assembly from the transversely movable weld wheel, whereby the weld wheel can more readily follow and respond to thickness variations in the work or material being fed into and through weld nip, thereby optimizing the ability of the pressing system to deliver a more consistent or uniform pressing force through the weld wheel onto the work or materials being welded, and at the same time enabling the work or materials being welded to be fed through the nip at a higher speed or rate, while at the same time permitting creation of an efficient and desirable seam weld on the work or materials. This improved bearing arrangement, as aforesaid, is also supported in such fashion as to permit compensation for significant weld wheel wear, such as significant reduction in diameter, while at the same time still permitting a pressing system to deliver a substantially uniform pressing force for high speed operation while compensating for thickness variations in the work or material being fed through the weld nip.

In the seam welding apparatus of this invention, as incorporating therein the improved bearing support arrangement for the transversely movable weld wheel (i.e., the upper weld wheel in the disclosed and preferred embodiment), the upper weld wheel is nonrotatably secured adjacent one end of an elongate electrically conductive shaft which is supported for rotation, which shaft adjacent its other end is rotatably supported within a conventional electrically conductive bearing assembly which rotatably supports the shaft and transmits electrical energy thereto from an external source such as a transformer. The shaft is of substantial axial length, and the upper weld wheel and electrically conductive bearing assemblies are disposed adjacent opposite ends of the shaft so as to be spaced a significant axial distance from one another. The nonrotatable housing associated with the bearing assembly is in turn pivotally supported on a slide member by a pivot which extends generally through the housing in transverse or perpendicular relation to the shaft axis, with this pivot axis also being disposed adjacent the end of the shaft mounting the bearing assembly so as to be remote from the weld wheel. A welding force generating assembly such as a fluid pressure cylinder and ram are mounted on the machine frame, with the ram being movably supported and acting downwardly onto the slide member to effect sliding displacement thereof in a direction generally perpendicular to the plane of the nip defined between the weld wheels. A spring unit is mounted on the slide member in close proximity to the end of the shaft which mounts the weld wheel. The spring unit has an electrical insulator associated therewith. This spring unit and its electrical insulator are rotatably supportingly engaged with the shaft closely axially adjacent the weld wheel so that the force generated by this unit is applied to the shaft and thence directly onto the weld wheel to create a weld force which is imposed on the work or materials located in the nip. Since the large and massive electrically conductive bearing assembly is located substantially at the remote pivot axis which enables the weld wheel to vertically float up and down in response to work or material thickness variations, the bearing assembly due to its proximity substantially at the pivot axis accordingly generates little inertia, and thus has little or only minimal effect on the vertical displacement of the weld wheel and hence the responsiveness thereof. At the same time the force generating unit still acts directly adjacent or in close proximity to the plane of the weld wheel so as to impose an effective downward welding force onto the upper weld wheel, and the fact that the weld wheel shaft is coupled to the force generating unit through the spring unit, thus also tend to minimize and effectively eliminate most of the inertia of the pressing ram so that the weld wheel can vertically respond to material thickness variations at the nip without having to being impeded in its motion due to the high inertia of the pressing ram and bearing assembly. Since the mass which is now being vertically displaced or cycled in response to material thickness variations has been substantially minimized, the inertia is likewise significantly minimized, and the weld wheel is able to more readily and rapidly respond to material thickness variations. This enables a more effective and uniform weld force to be maintained, and at the same time enables the work or materials as supplied to the nip to be fed therethrough at a higher speed or rate.

Further, since the weld shaft as well as the bearing and pivot support arrangement, as well as the spring unit, are all mounted on a slide member which itself is connected directly to and slidably displaced by the fluid pressure cylinder, the overall support bearing arrangement can in addition readily compensate for the significant reduction in weld wheel diameter, while still readily responding to and compensating for thickness variations in the material being welded so as to permit a seam weld to be created at a rather high speed.

With the improved arrangement of this invention, several advantages are believed provided, more specifically lower welding forces can be used, less current may be required for welding, higher welding speeds are believed obtainable, metal explosion during welding can be reduced or eliminated, larger weldability ranges are obtainable, welding wheel or electrode life is improved, and the pick-up or alloying of coatings during welding of coated materials is reduced.

Other objects and purposes of the invention will be apparent to persons familiar with structures of this general type upon reading the following specification and inspecting the accompanying drawings.

BRIEF DESCRIPTION OF THE DRAWINGS

FIG. 3 is a diagrammatic elevational view similar to FIG. 1 but illustrating a seam welding apparatus incorporating thereon the improved bearing support arrangement for the moving electrode according to the present invention.

FIGS. 4 and 5 are enlarged, fragmentary views taken generally along lines 4—4 and 5—5, respectively, in FIG. 3.

FIG. 6 is an enlarged central sectional view which illustrates a generally conventional electrically conductive bearing assembly and its typical positional relationship relative to a weld wheel.

FIG. 7 is a sectional view taken along line 7—7 in FIG. 6.

FIG. 8 is a diagrammatic elevational view similar to FIG. 3 and illustrating a seam welding apparatus incorporating therein the improved bearing support arrangement for the moving electrode according to the present invention, but showing some of the components in a slightly modified positional arrangement.

FIG. 9 is a fragmentary view taken generally along line 9—9 in FIG. 8.

Figure 1:
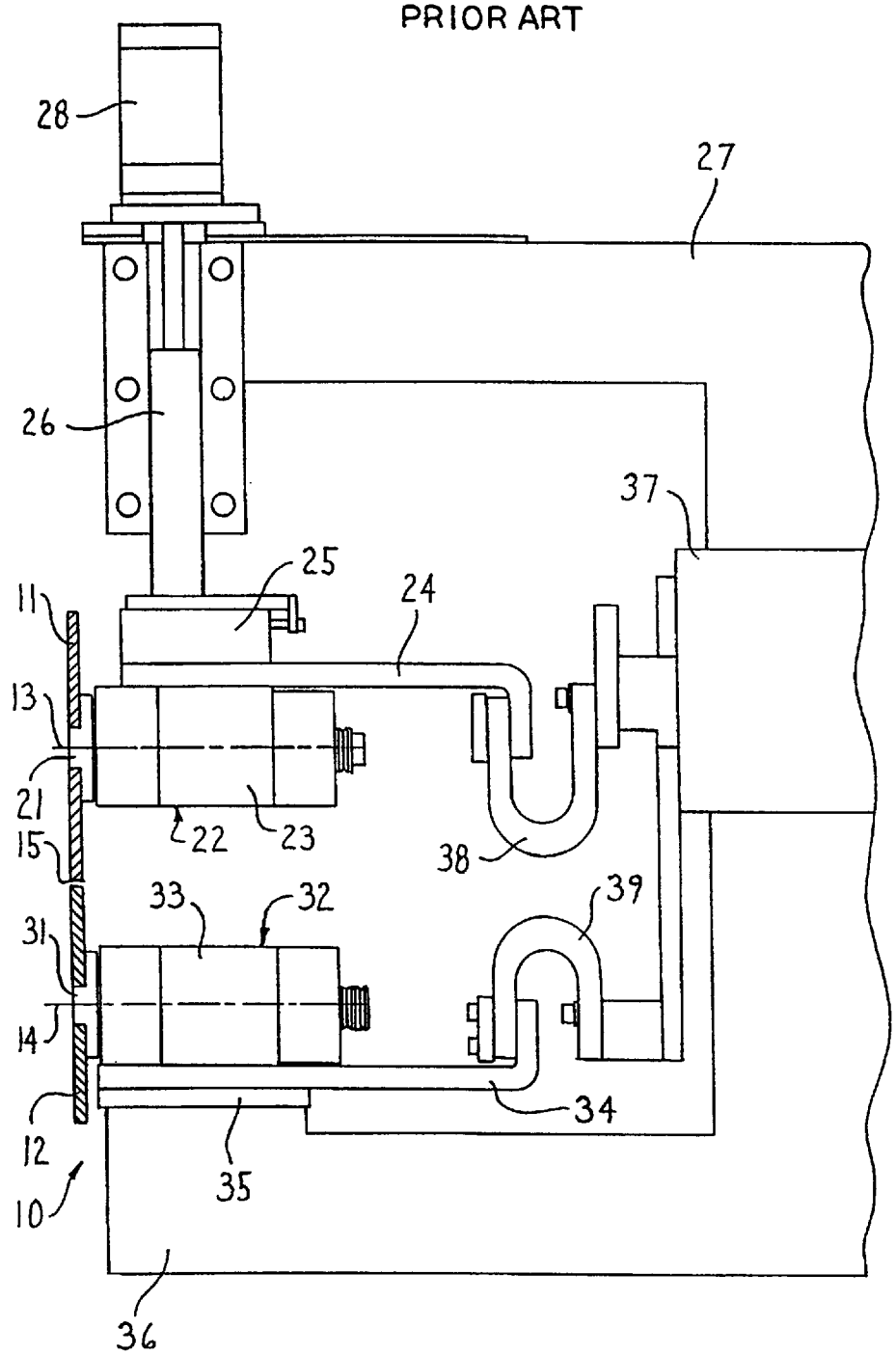
FIG. 1 is a diagrammatic elevational view of a conventional seam welding apparatus.
Figure 2:
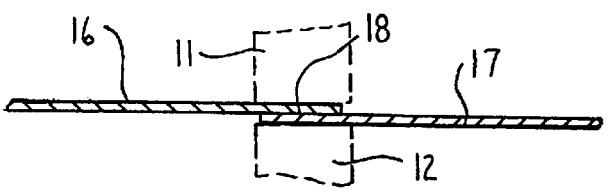
FIG. 2 is an enlarged, diagrammatic, cross sectional view illustrating a typical work which is fed into the weld nip to effect seam welding thereon, which work in the illustrated embodiment comprises overlapping sheet metal layers.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the apparatus and designated parts thereof. Said terminology will include the words specifically mentioned, derivatives thereof, and words of similar import.

DETAILED DESCRIPTION

Referring to FIG. 3, there is diagrammatically illustrated a seam welding apparatus 50 which incorporates therein an improved bearing support arrangement for the upper weld wheel, which arrangement minimizes inertia to permit significant increase in the movement responsiveness of the upper weld wheel during seam welding, while at the same time adjusting for weld wheel wear.

More specifically, the welding apparatus 50 includes conventional upper and lower weld wheels or electrodes 51 and 52, respectively, which are respectively supported about substantially parallel and horizontally extending axes 53 and 54, whereby the vertically opposed weld wheels define a weld zone or nip 55 between the cylindrical peripheries thereof whereat the wheel peripheries directly engage the work or material to be welded, such being conventional.

The lower weld wheel 52 is nonrotatably supported on a shaft 56 which defines the axis 54 and is rotatably supported in a conventional electrically conductive bearing assembly 57, the latter typically being of a construction similar to that illustrated in FIGS. 6–7. The bearing assembly 57 has the nonrotatable housing thereof fixedly joined to an electrically conductive member or plate 58, the latter being stationarily mounted on the machine frame 61 through an appropriate electrical insulator 59. The conductive member or plate 58 is electrically joined to a welding transformer 63 through a conventional flexible conductive strap 62.

The construction and support for the lower weld wheel 52 is conventional, and generally corresponds to that of FIG. 1 described above.

As to the upper weld wheel 51, it is nonrotatably secured adjacent one end of an elongate conductive shaft 66, which shaft extends generally horizontally and defines the rotational axis 53. This shaft 66 at its other end is rotatably supported within a conventional electrically conductive bearing assembly 67. The bearing assembly 67 will typically employ silver coated copper contact shoes similar to that which is diagrammatically illustrated in FIGS. 6–7. The housing 68 of the bearing assembly is nonrotatable and is fixedly secured to a conductive member or plate 69. This plate 69 in turn is connected to one end of a flexible conductive strap 71, the other end which is connected to the welding transformer 63.

The housing 68 of the bearing assembly 67 is disposed within a support yoke 72 which is fixed to and in the illustrated embodiment projects downwardly from a slide member 73, the latter being vertically slidably supported relative to the machine frame, as described hereinafter, whereby the slide member 73 is thus linearly movable in a direction which is substantially perpendicular to the shaft axis 53 and more importantly is substantially perpendicular to the horizontal plane which is effectively defined by the nip 55. This yoke 72 supports thereon a pivot shaft 74 which defines a generally horizontal pivot axis 75 which extends transversely, and more specifically perpendicularly, relative to the rotational axis 53 of the upper weld wheel 51. This pivot shaft 74 is in turn joined to the bearing housing 68 so that the entire bearing assembly 67 is thus supported so as to be pivotally displaceable through at least a limited extent about the pivot axis 75.

As illustrated by FIG. 3, the upper weld wheel 51 and the conductive bearing assembly 67 are axially spaced a substantial distance apart, and in fact are disposed in remote special relationship with one another by being respectively disposed adjacent opposite ends of the elongate shaft 66. The pivot shaft 74 is likewise disposed adjacent the end of the shaft 66 which is remote from the weld wheel 51, namely the pivot axis 75 is disposed so as to substantially directly intersect the bearing assembly 67, whereby the mass of the bearing assembly 67 thus has minimal off balance or eccentricity about the pivot axis 75 and thus has little inertial effect when the upper weld wheel 51 is displaced vertically so as to effectively cause a vertical pivotal movement of the shaft 66 about the pivot axis 75.

The weld force generating assembly is also mounted directly on the frame and, in the illustrated embodiment, includes a conventional pressurizeable air cylinder unit 81 which is mounted on the machine frame 77. The extendable piston rod of the air cylinder 81 is joined to an elongate ram 82 which is vertically movably supported on the frame by guides 76, and the lower end of the movable ram 82 in turn is fixedly coupled to the slide member 73 so as to control the vertical up and down displacement thereof relative to the machine frame. The connection of the elongate ram 82 to the slide member 73 is, in the illustrated embodiment, disposed in close proximity to the end of the shaft 66 which mounts the weld wheel 51 thereon.

The slide member 73 in turn is connected to the shaft 66 through a spring unit 83. This spring unit 83 in turn at its lower end is joined to an electrically insulative sleeve bushing 84 which is disposed in supportive and surrounding engagement with the shaft 66 at a location adjacent the outer end thereof, namely axially adjacent the upper weld wheel 51.

The weld force generating assembly as described above, namely the pressure cylinder 81 and the ram 82 which acts through the slide member 73 and then through the spring unit 83, is capable of applying a downward weld force onto the upper weld wheel 51 for transmission through the work or material onto the lower weld wheel 52, the latter being nonvertically movably supported by the frame. However, due to the presence of the spring unit 83 as interposed between the shaft 66 and the ram 82, the upper weld wheel 51 can readily vertically move upwardly and downwardly in response to changes in material thickness at the weld nip, which vertical movement of the weld wheel and a corresponding pivoting of the shaft 66 about the axis 75, does not have to overcome any significant inertia created by the weld force generating assembly since the presence of the intermediate spring unit 83 readily accommodates slight vertical movement variations in the position of the weld wheel 51, and enables rapid responsive movement thereof without having to cause a corresponding vertical displacement of the ram 82 and of the inertia effects caused thereby. The inertia effects of the pressing ram, as well as the inertia effects of the large electrically conductive support bearing assembly 67, are thus significantly minimized if not substantially eliminated, and accordingly the upper weld wheel 51 has the capability to much more rapidly respond to and accordingly remain in uniform pressing contact with the material at the nip irrespective of significant and varying changes in material thickness. This ability to respond and more closely follow the changes in material thickness, while at the same time maintaining a more uniform weld force as applied between the upper and lower weld wheels, additionally permits an increase in the speed of the material as it is fed into and through the weld nip. At the same time, the arrangement also compensates for wear-induced reductions in weld-wheel diameter inasmuch as the driving cylinder 81 effects a continuous downward pressing of the slide member 83 in a direction toward the nip so that the upper weld wheel is continuously urged downwardly toward the lower weld wheel to maintain the desired nip therebetween. Since the slide member 73 mounts the entirety of the spring pack 83 as well as the shaft 66 and pivot bearing arrangement 67, the entire compensating bearing arrangement thus moves downwardly during wear compensation so as to require only minute pivoting of the shaft 66 about the pivot 74 so as to compensate for thicknesses of the material at the nip without creating any significant misalignment between the opposed peripheral surfaces of the weld wheels 51 and 52 where they engage the material positioned therebetween.

One type of spring unit 83 is illustrated diagrammatically in FIG. 5, and includes upper and lower mounting plates 91 and 92, respectively, which contain a plurality of vertically-acting compression springs 93 therebetween. The upper plate 91 is fixedly joined to the slide member 73, and the lower mounting plate 92 is fixed to the bushing 84. The upper and lower plates 91 and 92, however, are suitably joined as by bolts 94 so as to permit relative vertical movement therebetween, which bolts 94 in the illustrated embodiment have the lower ends fixed to the bottom plate 92 whereas the bolts slidably project upwardly through the top plate 91 so as to permit relative vertical displacement between the top and bottom plates in accordance with compression and expansion of the springs 93. This spring unit 93 will normally be maintained in a preset compressed force condition so that the downward force from the ram 82, acting through the slide member 73, is always imposed on and acts through the spring unit with respect to imposing a clamping force at the weld nip. The spring unit 83 is illustrated solely as an example, and it will be appreciated that numerous other constructions of the spring unit are suitable for inclusion in the arrangement of this invention.

It will be appreciated that the positional relationship of the upper weld wheel 51 relative to the location of the conductive support bearing 67 will vary depending upon performance parameters desired, including material speed and range of material thickness variations. However, in a preferred and anticipated minimal optimum condition, it is contemplated that the shaft 66 supporting the transversely movable weld wheel (i.e., the upper weld wheel 51 in the illustrated and preferred embodiment) will have sufficient axial length so as to enable the upper weld wheel 51 and the conductive support bearing 67 therefor to be axially spaced apart by a distance of at least 18 inches, and in many instances a distance of at least about three feet, such distance being indicated generally at D in FIG. 3. Further, the weld wheel 51 typically has a maximum outer diameter in the range of about 12 to about 14 inches, and the length D between the weld wheel 51 and pivot axis 74 is preferably at least one and one-half to two times the diameter of the weld wheel 51.

As illustrated in FIGS. 3–4 and as described above, the pivot axis 75 is displaced sidewardly (i.e., downwardly) a small distance from the shaft axis 53 so as to be in nonintersecting but perpendicular relationship therewith. The pivot axis 75 is preferably positioned so that the axis 75 is located generally within or as close as possible to a horizontal plane 85 which passes through the weld nip 55. With this positional relationship, the entire upper weld wheel 51 and its support shaft 66, when subjected to vertical pivoting about the axis 75, will thus provide primarily solely vertical displacement of the lower circumferential face of the weld wheel 51 defining the upper boundary of the nip 55, whereby the wheel 51 effectively perceives solely a change in vertical clearance, and is not effected in any significant manner due to the pivoting effect about the axis 75. While positioning of the pivot axis 75 within this plane 85 is thus preferred, it will be appreciated that the pivot axis 75 can be otherwise positioned if desired, and in fact could be positioned so as to perpendicularly intersect the shaft axis 53 with the pivot axis in turn passing substantially through the mass centroid of the conductive bearing assembly 67 so as to still further minimize any rotational inertia effect caused by the bearing assembly.

Reference will not be made to FIGS. 8 and 9 which again illustrate therein an arrangement according to the present invention but which, while similar to FIG. 3, discloses the overall seam welding in somewhat greater detail, and illustrates some slightly different positional relationships for the various components. The corresponding parts in FIGS. 8–9 are designated by the same reference numerals utilized in FIGS. 3–5 except with an addition of "A" thereto.

As shown in FIG. 8, the driver or pressure cylinder 81A is mounted on the machine frame 61A and has a vertically downwardly projecting and elongated ram or piston rod 82A projecting therefrom, the latter being vertically slidably guided within a suitable bearing or guide structure 76A secured to the machine frame. This ram 82A at its lower end couples to and supports the slide or support member 73A, the latter being cantilevered horizontally or sidewardly, and having the yoke 72A at the free end which in turn supports the current-conductive bearing arrangement 67A through the intermediate transverse horizontal pivot 74A. This pivot 74A is, in this variation, positioned downwardly a substantial distance below the shaft axis 53A, and in fact is positioned as close as is reasonably possible to a horizontal plane passing through the nip 55A, although in this instance the pivot 74A is positioned somewhat above this latter plane so as to not interfere with the support structure or table which supports the sheet materials which are to be seam welded. The spring unit 83A is coupled to the support member 73A substantially directly under the ram 82A, and is supportingly engaged with the weld wheel shaft 66A adjacent the outer end thereof, that is, closely adjacent the weld wheel 51A. The conductive bearing 67A is joined to the flexible current-conductive strap 71A, the other end of which is connected to an appropriate current conductive element 71B which is supported in an electrically insulated manner on the machine frame. This conductive element 71B in turn is connected in a conventional manner to the welding transformer (not shown).

The overall structural and functional relationships of the seam welder illustrated by FIGS. 8 and 9 generally corresponds to the structural and functional relationships possess by the arrangement of FIGS. 3–5, as described above, so that further description of FIGS. 8–9 is believed unnecessary.

While the description presented above describes the weld wheel axes as being generally parallel, it will be appreciated that the weld wheels are in some instances disposed in slightly skewed relationship with respect to one another to assist in gripping and holding of the work in the nip, and according this conventional skewed relationship will be encompassed within the construction of this invention and within the general description with respect to the two weld wheels being supported for rotation about axes which are generally parallel with one another.

In the seam welding apparatus incorporating the improved bearing support arrangement of this invention, while the low-inertia bearing support has been disclosed for use in association with the upper weld wheel, it will be appreciated that the invention likewise is applicable for use with the lower weld wheel if desired, and in fact both of the upper and lower weld wheels can be supported by a low-inertia bearing arrangement in accordance with the present invention if desired.

It will also be understood that the upper and lower weld wheels are both rotatably driven, such driving of the weld wheels being conventional, for example by driving the weld wheel shafts or by driving the weld wheels through separate knurled drive wheels peripherally engaged therewith. Since the driving of the weld wheels is well known, further detailed description and illustration thereof is believed unnecessary.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a resistance seam weld apparatus having a frame, first and second wheel-type welding electrodes disposed vertically one above the other and defining a weld nip therebetween, first and second rotatable shafts respectively having said first and second electrodes nonrotatably secured thereto, and first and second electrically conductive bearing assemblies for respectively rotatably supporting said first and second shafts and for permitting transfer of electrical current therethrough to the respective shaft for supply to the respective electrode, each of said bearing assemblies having a nonrotatable outer housing, a conductive current-transmitting member joined to each said housing and to a welding transformer, said first welding electrode being vertically movable to accommodate thickness variations of the work located in the weld nip, and a welding force generating device cooperating with said first welding electrode for applying a force thereto so as to urge said first welding electrode toward said second welding electrode, comprising the improvement wherein said first shaft is axially elongated and has said first welding electrode mounted thereon adjacent one end thereof and said first electrically conductive bearing assembly cooperates with said first shaft at a location spaced axially a substantial distance away from said first welding electrode, and a support arrangement coupling the housing of said first bearing assembly to said frame, said support arrangement including a slide member which is slidably supported for movement in a direction generally perpendicular to a plane which is defined by the weld nip, the welding force generating device being coupled to the slide member for controlling movement thereof, said support arrangement also including a pivot connected between said housing and said slide member and defining a pivot shaft which extends generally perpendicularly relative to said first shaft and which is displaced axially a substantial distance from said first welding electrode whereby rotational inertia of said first conductive bearing assembly about said pivot axis is minimized when said first electrode vertically moves causing pivoting of said first shaft about said pivot axis.

2. A welding device according to claim 1, wherein said welding force generating device is mounted on said frame and includes a force-transmitting ram slidably supported on said frame and connected to said slide member and interconnected to said first shaft through a compressible spring unit, said spring unit being interconnected to said first shaft at a location disposed in axially close proximity to said first electrode.

3. A welding device according to claim 2, wherein said first conductive bearing assembly is axially spaced from said first welding electrode by a distance of at least about 18 inches.

4. A welding device according to claim 2, wherein said pivot axis directly intersects the housing of said first conductive bearing assembly and is spaced axially from said first welding electrode by a distance which is at least about three feet.

5. A welding device according to claim 1, wherein said second conductive bearing assembly is disposed for rotative support with said second shaft at a location disposed directly axially adjacent said second welding electrode, and wherein said first and second conductive bearing assemblies are horizontally displaced a substantial distance apart due to said first bearing assembly being located axially remotely from said first welding electrode.

6. A welding device according to claim 2, wherein said spring unit includes an electrically insulative annular bearing which supportingly surrounds said first shaft directly axially adjacent said first welding electrode.

7. A welding device according to claim 1, wherein said pivot axis is disposed closely adjacent a horizontal plane which passes through the nip between said first and second welding electrodes.

8. In a resistance-type seam welding apparatus having a frame, upper and lower welding wheels defining electrodes and being disposed vertically one above the other and defining a welding nip therebetween for effecting seam welding of work fed into the nip, one said weld wheel being nonrotatably secured to a generally horizontally extending shaft which is rotatable about an axis which extends generally horizontally, an electrically-conductive bearing assembly disposed in supportive engagement with said shaft, said bearing assembly including an outer nonrotatable housing which confines bearings for rotatably supporting the shaft and electrically conductive shoes engaged with the shaft for transmitting electrical current thereto, said one weld wheel and said shaft being movably mounted on said frame for permitting at least limited vertical displacement thereof to accommodate material thickness variations at said nip, and an electrically conductive member connected at one end to said housing and being connectable at another end to a welding transformer for supplying electrical current to said shaft, the improvement comprising pivotal support means connected to the housing of said conductive bearing assembly for providing pivotal support of said conductive bearing assembly about a generally horizontal pivot axis which extends generally perpendicularly with respect to shaft axis and which is displaced axially a substantial distance from a vertical plane containing the upper weld wheel, said pivot axis being positioned in close proximity to said conductive bearing assembly for minimizing rotational inertia of said bearing assembly.

9. A welding apparatus according to claim 8, wherein said pivot axis is disposed substantially within a vertical plane which substantially perpendicularly intersects said shaft axis.

10. A welding apparatus according to claim 9, wherein said pivot axis is disposed generally or closely adjacent a horizontal plane which passes through the nip defined between said upper and lower weld wheels.

11. A welding apparatus according to claim 8, wherein said pivot axis is disposed generally or closely adjacent a horizontal plane which passes through the nip defined between said upper and lower weld wheels.

12. A welding apparatus according to claim 8, including a force generating device connected between said frame and said shaft for applying a vertically downwardly directed force to said shaft for creating a welding force at said nip, said force generating device including a vertically movable pressing element coupled at a lower end thereof to a spring unit, and said spring unit in turn being joined to an electrically conductive support sleeve which rotatably supportingly engages said shaft at a location axially adjacent said upper weld wheel.

13. A welding apparatus according to claim 8, including a slide member which is vertically slidably supported for slidable displacement in a direction which extends generally perpendicular with respect to a plane which contains the welding nip, said pivotal support means and said shaft being mounted on and carried by said slide member.

14. A welding apparatus according to claim 13, including a vertically compressible spring unit connected between said slide member and said shaft at a location axially adjacent said one weld wheel.

15. A welding apparatus according to claim 14, including a force generating device connected between said frame and said slide member for applying a vertically directed force to said slide member and through said spring unit to said shaft for creating a welding force at said nip.

16. A welding apparatus according to claim 15, wherein said pivot axis is disposed generally within or closely adjacent the horizontal plane defined by said nip.

* * * * *